US011748627B2

(12) United States Patent
Domokos et al.

(10) Patent No.: US 11,748,627 B2
(45) Date of Patent: Sep. 5, 2023

(54) NEURAL NETWORK WITH A LAYER SOLVING A SEMIDEFINITE PROGRAM

(71) Applicants: Robert Bosch GmbH, Stuttgart (DE); Carnegie Mellon University, Pittsburgh, PA (US)

(72) Inventors: Csaba Domokos, Simmozheim (DE); Jeremy Zieg Kolter, Pittsburgh, PA (US); Po-Wei Wang, Pittsburgh, PA (US); Priya L. Donti, Pittsburgh, PA (US)

(73) Assignees: ROBERT BOSCH GMBH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 464 days.

(21) Appl. No.: 16/872,702

(22) Filed: May 12, 2020

(65) Prior Publication Data

US 2020/0372364 A1    Nov. 26, 2020

(30) Foreign Application Priority Data

May 20, 2019  (EP) .................................... 19175484
May 22, 2019  (EP) .................................... 19176011

(51) Int. Cl.
*G06N 5/04*        (2023.01)
*G06N 3/084*       (2023.01)
(Continued)

(52) U.S. Cl.
CPC ............ *G06N 3/084* (2013.01); *G06F 17/16* (2013.01); *G06N 3/04* (2013.01); *G06N 3/047* (2023.01); *G06N 5/04* (2013.01)

(58) Field of Classification Search
CPC ...................................................... G06N 7/00
See application file for complete search history.

(56) References Cited

U.S. PATENT DOCUMENTS

2005/0278124 A1 * 12/2005  Duffy ..................... G16C 20/30
                                                      702/19
2008/0281767 A1 * 11/2008  Garner ................ G05B 13/027
                                                      706/25

(Continued)

OTHER PUBLICATIONS

Brandon Amos, et al., "OPTNET: Differentiable Optimization as a Layer in Neural Networks", Cornell University, 2019, pp. 1-13. https://arxiv.org/abs/1703.00443.

(Continued)

*Primary Examiner* — Jae U Jeon
(74) *Attorney, Agent, or Firm* — NORTON ROSE FULBRIGHT US LLP; Gerard Messina

(57) ABSTRACT

A system for applying a neural network to an input instance. The neural network includes an optimization layer for determining values of one or more output neurons from values of one or more input neurons by a joint optimization parametrized by one or more parameters. An input instance is obtained. The values of the one or more input neurons to the optimization layer are obtained and input vectors for the one or more input neurons are determined therefrom. Output vectors for the one or more output neurons are computed from the determined input vectors by jointly optimizing at least the output vectors with respect to the input vectors to solve a semidefinite program defined by the one or more parameters. The values of the one or more output neurons are determined from the respective computed output vectors.

22 Claims, 5 Drawing Sheets

(51) Int. Cl.
*G06F 17/16* (2006.01)
*G06N 3/04* (2023.01)
*G06N 3/047* (2023.01)

(56) References Cited

U.S. PATENT DOCUMENTS

| | | | |
|---|---|---|---|
| 2017/0213129 A1* | 7/2017 | Lee | G06N 3/0454 |
| 2018/0299841 A1* | 10/2018 | Appu | G05D 1/0088 |
| 2019/0102678 A1* | 4/2019 | Chang | G06K 9/6298 |
| 2019/0197398 A1* | 6/2019 | Jamali | G06N 3/084 |
| 2020/0117993 A1* | 4/2020 | Martinez-Canales | G06F 17/16 |

OTHER PUBLICATIONS

Diederik P. Kingma, et al., "ADAM: a Method for Stochastic Optimization", Cornell University, 2017, pp. 1-15. https://arxiv.org/abs/1412.6980.

* cited by examiner

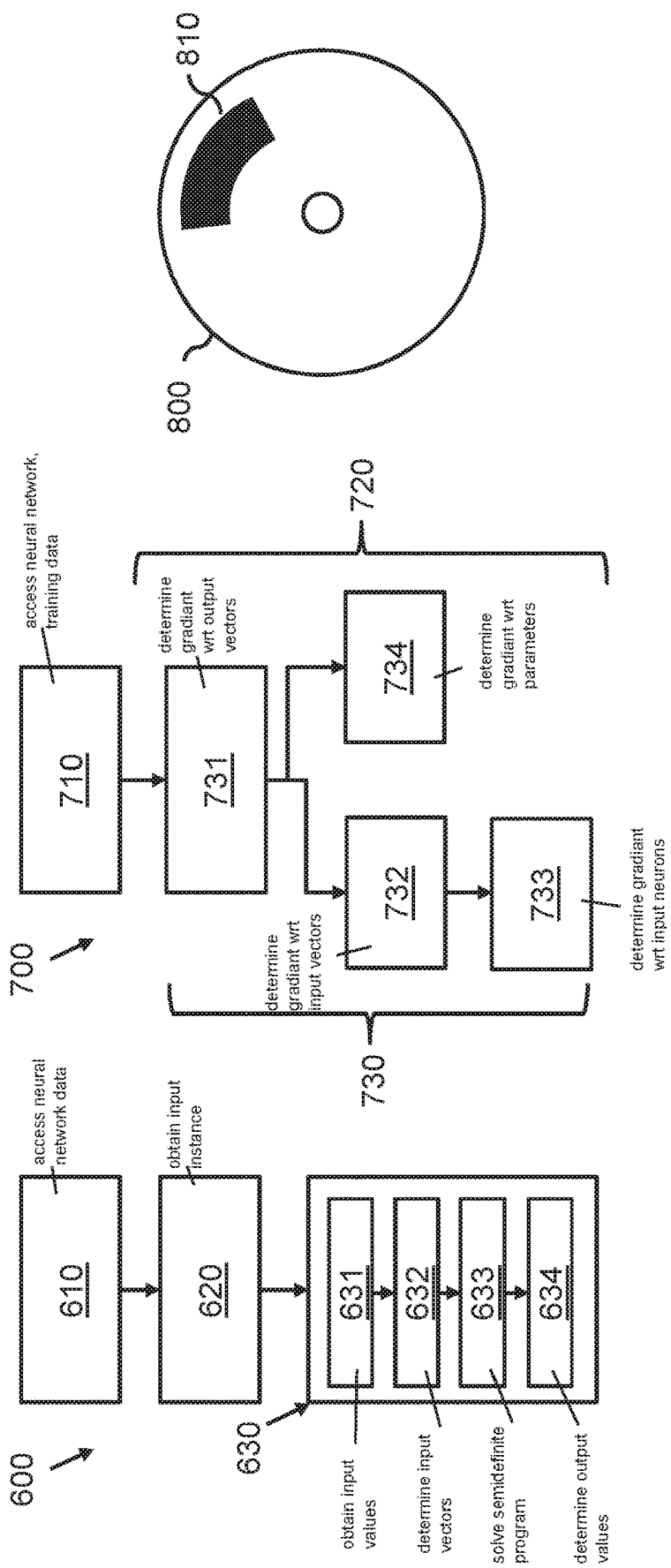

NEURAL NETWORK WITH A LAYER SOLVING A SEMIDEFINITE PROGRAM

CROSS REFERENCE

The present application claims the benefit under 35 U.S.C. § 119 of European Patent Application No. EP 19175484.5 filed on May 20, 2019, and European Patent Application No. EP 19176011.5 filed May 22, 2019, which are both expressly incorporated herein by reference in their entireties.

FIELD OF THE INVENTION

The present invention relates to a system for applying a neural network to an input instance, e.g., an input image, and a corresponding computer-implemented method. The present invention further relates to a system for training a neural network, and a corresponding computer-implemented method. The present invention further relates to a computer-readable medium comprising instructions to perform the method or data representing parameters of a neural network.

BACKGROUND INFORMATION

An autonomous device has to make decisions based on the observed environment. For example, an autonomous driving system for a vehicle may use data from cameras and/or various other sensors to analyse the traffic situation, and use this information for controlling the vehicle. Similarly, a safety system for a non-autonomous car may analyse the traffic situation to assist the driver, e.g., to brake if a dangerous situation occurs. In this example and in other settings, making a decision comprises not only recognizing objects but also making inferences, e.g., about which recognized objects or combinations of objects are dangerous. Making automated inferences also occurs, for instance, in other control systems, in medical image analysis, etc.

In these and other kinds of systems, neural networks and in particular deep neural networks may be used to make such inferences about the environment. A neural network typically comprises one or more layers, in each of which the values of one or more output neurons are computed based on the values of one or more input neurons. For example, the neural network may have at least 10, 100, or 1000 neurons, at least 2, 5, or 10 layers, etc. Layers may differ, for instance, in which input neurons are connected to which output neurons, and/or which functions are used to compute the values of the output neurons. Typically, one or more parameters of a layer are learnable, e.g., such parameters may comprise weights determining to which extent the value an output neuron is influenced by the values of respective input neurons that it is connected to. Various types of layers are known per se. For example, convolutional neural networks typically comprise an input layer, an output layer, and one or more layers in between the input layer and the output layer, typically referred to as hidden layers. Such hidden layers may comprise convolutional layers, ReLU layers, pooling layers, fully connected layers, normalization layers, etc. For example, combinations of such layers may be used to perform various kinds of image classification tasks.

In the paper "OptNet: Differentiable Optimization as a Layer in Neural Networks" by Brandon Amos and J. Zico Kolter (incorporated herein by reference and available at https://arxiv.org/abs/1703.00443), a deep neural network is presented that is designed to capture constraints and dependencies between hidden states of the neural network. To this end, a quadratic program is integrated as a layer in the network. The layer is inserted in the neural network to capture constraints and complex dependencies between the hidden states of the neural network. Both the output of the layer and the problem data defining the quadratic program may depend on the values of the previous layer. The output values of the layer are obtained by solving the quadratic program using a primal-dual interior point method.

SUMMARY

In accordance with a first aspect of the present invention, a system for applying a neural network to an input instance is provided. In accordance with a further aspect of the present invention, a system for training a neural network is provided. In accordance with further aspects of the present invention, computer-implemented methods of applying and training a neural network are provided. In accordance with further aspects of the present invention, computer-readable media are provided.

In various example embodiments of the present invention, the neural network comprises at least one optimization layer for determining values of one or more output neurons from values of one or more input neurons by a joint optimization. Generally, in a joint optimization, the values of the one or more output neurons are not computed independently from each other. For example, the joint optimization may comprise minimizing a loss function that is based on the values of the one or more output neurons. The optimization may be joint in the sense that the output values that minimize the loss function depend on each other, e.g., for a given output neuron, its optimal value in combination with one set of values for the other output values may be different from its optimal value in combination with another set of values. In other words, if the values of the other output neurons are fixed, then the value of the output neuron that minimizes the loss function may be different depending on the values of the output neurons. Therefore, the values of the output neurons may be computed in a joint optimization. The joint optimization may be parametrized, e.g., the optimization problem to solve may depend on one or more parameters.

Interestingly, computing the output vectors may comprise solving a semidefinite program defined by the one or more parameters. Semidefinite programs are interesting because they allow to express a relatively wide class of optimization problems that can be solved relatively efficiently. For example, the semidefinite program may comprise a relaxation of a MAXSAT problem. The MAXSAT problem and related problems such as MAXCUT are of particular interest because they allow to capture a wide set of discrete logical relationships between the input and output values of the optimization layer, e.g., they allow to effectively capture hard and/or global relationships between the input and output values of the optimization layer.

Interestingly, in various embodiments such relationships are defined by parameters of the joint optimization, so that the neural network can effectively learn relationships between the input and output neurons of the optimization layer in and end-to-end fashion. For example, the neural network may be trained in such a way that in the same process it is learned how to determine the inputs to the optimization layer, e.g., as outputs of a convolutional, layer, a ReLU layer, etc., and/or what relationships hold between these inputs and the outputs of the optimization layer as defined by the set of parameters, and/or how to use the outputs of the optimization layer in further layers of the neural network, e.g., a fully connected layer, a further optimization layer, etc.

MAXSAT problems and other kinds of discrete optimization are typically not suitable for direct inclusion in a neural network. For example, for training the neural network, it is typically desirable if the forward pass of the neural network, e.g., the computation of the output values from the input values, is amenable to backpropagation. For instance, it is desirable if the input/output relationship of the optimization layer can be described as a function, preferably a differentiable and/or continuous function. Moreover, MAXSAT and related problems are well-known to be hard to solve exactly. In particular, MAXSAT is known to be NP-hard. This also makes difficult to efficiently include such problems in a neural network.

Accordingly, in accordance with example embodiments of the present invention, the optimization is performed on vectors associated to the input and output values rather than on the values themselves. Such vector optimizations may be better amenable to application as a neural network layer. For example, by suitably converting input values to vectors, performing the vector optimization, and converting the output vectors back to values, a neural network layer with a continuous and/or differentiable parametrization may be obtained. Moreover, vector optimizations may be solvable relatively efficiently, e.g., a relaxation of an NP-hard optimization problem such as MAXSAT may provide only an approximate solution to the problem, but provides such a solution much more efficiently than solving the original problem. A concrete example of a vector optimization obtained as a relaxation of a MAXSAT is provided below.

The optimization layer may be applied to the values of the input neurons by determining input vectors for the one or more input neurons, e.g., an input vector for each input neuron. The input vectors each comprise multiple values. In particular, for MAXSAT relaxations, the vectors may comprise at least $\sqrt{2n}+1$ elements, where n is the number of values of the optimization layer, e.g., input variables/values, output variables/values and optionally also auxiliary variables as discussed in more detail later. For example, an input vector ($v_\alpha$) for an input neuron may be determined as a scalar multiple, e.g., $v_\alpha = -\cos(\pi z_\alpha)v_0$, of a predetermined vector ($v_0$) by a scalar based on the value of the input neuron ($v_\alpha$). The predetermined vector $v_0$ may be referred to as a truth direction.

Given the input vectors, output vectors for the one or more output neurons may be determined by jointly optimizing at least the output vectors with respect to the input vectors to solve a semidefinite program defined by the one or more parameters. The output vectors typically have the same dimensions as the input vectors. For example, the optimization may be a MAXSAT relaxation or a MAXCUT relaxation, in other words, the output vectors may correspond to approximate solutions to a respective optimization problem. However, other SDPs can be used as well, e.g., SDPs obtained as vector relaxations of other optimization problems. Various examples of optimizations are provided below.

The values of the one or more output neurons may be determined from the respective computed output vectors. For example, if the semidefinite program is a relaxation of a given optimization problem, e.g., a vectorized problem corresponding to a discrete optimization of values, then the values may be determined as an approximate solution to the problem that it is a relaxation of. For example, a value of an output neuron ($z_\omega$) may be determined based on a direction difference, e.g., $\cos^{-1}(-v_\omega^T v_0)/\pi$, between the output vector of the output neuron ($v_\omega$) and the predetermined vector ($v_0$). In some examples, randomized rounding is applied, e.g., the values of the one or more output neurons are determined by generating one or more random hyperplanes, e.g., from the unit sphere, and checking whether the output vector and the predetermined vector are on the same side of the one or more hyperplanes.

Multiple optimization layers can be applied in the neural network, e.g., at the same layer or at multiple layers. For example, a sequence of multiple optimization layers may be subsequently applied. In various embodiments of the present invention, the parameters of the joint optimization for multiple optimization layers are tied, e.g., the multiple optimization layers are parametrized by the same or at least overlapping sets of parameters. For example, conceptually, this may enable the multiple optimization layers to learn the same kinds of relations between their respective inputs. In such cases, less parameters may be needed, avoiding overfitting, etc.

By means of the various measures discussed herein, neural networks may be provided that improve on traditional deep learning and/or existing logical learning methods in several respects. The neural network may be enabled to reliably learn various tasks, e.g., improved image classification, without any prior knowledge. By wrapping the powerful yet generic primitive of semidefinite programming and in particular MAXSAT relaxations, our solver may enable implicit logical reasoning to occur where needed within larger frameworks, without precise structure of the domain needing to be known.

For example, in various embodiments of the present invention, a differentiable smoothed MAXSAT solver is provided that can be embedded within more complex deep architectures, allowing effective end-to-end learning of complex logical relationships from examples without any hard-coding of these relationships.

Using the techniques presented herein, various kinds of problems may be solved that are essentially impossible for traditional deep learning/logical learning methods to reliably learn without prior knowledge. In a fully end-to-end setting, for example, classical convolutional networks may be integrated with the differentiable MAXSAT solver, to learn constraint satisfaction problems which are challenging for modern neural network architectures.

The techniques described herein are applicable to various kinds of data, e.g., sensor data, audio data, video data, radar data, LiDAR data, ultrasonic data, or various individual sensor readings or their histories. For example, in an example embodiment, the neural network is used for image captioning or image classification. The network may in these and other applications comprise one or more convolutional layers, followed by one or more optimization, and one or more output layers, e.g., fully connected layers or sentence generation layers as are conventional in the art, e.g., layers of an LTSM network, recurrent neural networks, etc.

As another example, a neural network according to an embodiment may be used to recognize an action in a video, e.g., a sequence of images. For example, in these and other embodiments, the neural network may comprise one or more convolutional layers, followed by one or more optimization layers, followed by at least a fully connected layer.

In various embodiments, the neural networks as described herein may be able to perform classifications, regressions, etc. based on relatively complex relationships in the data, e.g., hard constraints. Traditional neural networks may not be able to capture such constraints efficiently. For example, many layers may be needed to express the relationship, and as a consequence, more parameters and/or training data may be needed and/or the neural network may be more amenable to overfitting as a consequence. Hence, neural networks according to an embodiment may require less trainable parameters to express logical relationships in data, or, despite having the same or less trainable parameters, may better express such logical relationships. At the same time, it may not be needed to pre-constrain the kinds of relationships the optimization layer can learn, e.g., it may not be needed to explicitly define between which values the optimization layer learns a relationship.

As a particular example, consider a system that analyses traffic situations, e.g., as part of an autonomous vehicle, as part of a safety system for a non-autonomous vehicle, etc. Such a system may classify traffic situations as dangerous or non-dangerous, for example. A root cause for a traffic situation being dangerous may be that cars are close to each other. However, it could be that in many training instances, cars are close to each other because it is raining, because this is when it gets busy on the road. Especially if the training dataset is small and/or if two such factors frequently occur together, a traditional neural network may not be able to learn which factor is the root cause and which factor is merely correlated. In fact, a traditional neural network may use many layers and/or neurons to learn such logical constraints, or the neural network may not be able to capture such logical constraints effectively at all. Therefore for a traditional neural network it may not pay off to learn this kind of inferences. Instead for such a neural network it may be more efficient to make an inference, e.g., about a traffic situation being dangerous, both when its root cause is satisfied and when a correlated factor is present. The result may be a trained network that generalizes insufficiently to new situations.

Using an optimization layer as described herein, however, may allow to more efficient to learn such logical relations between data, e.g., one or a few clauses may be sufficient to learn that close cars is the relevant factor and rain is merely correlated. For example, a small number of parameters of the optimization layer may allow such a logical relationship to be effectively captured. Hence, a network may be obtained that generalizes better beyond the training data, and/or that requires less training instances and/or parameters to obtain a given performance.

Interestingly, various neural networks as defined herein may not require an existing set of known relationships or rules. For example, no seeding with prior structure about which variables are allowed to interact may be required. Effectively, in various embodiments, the entire structure and its parameters may be learned end-to-end for a wide class of problems.

Optionally, the input instance comprises an image, and the neural network comprises at least one convolutional layer, the at least one convolutional layer being followed by one or more optimization layers. This way, a particularly good image classifier may be obtained.

Optionally, the semidefinite program comprises a relaxation of a MAXSAT problem, a MAX2SAT problem or a MAXCUT problem with respect to the values of at least the one or more input neurons and the one or more output neurons. MAXCUT, MAX2SAT and MAXSAT allow to particularly efficiently represent logical constraints and solving their vectorized relaxations may be performed relatively efficiently.

Optionally, the output vectors are computed by optimizing one or more auxiliary vectors jointly with the output vectors. The auxiliary vectors are typically not used elsewhere in the neural network. By introducing auxiliary vectors, the size of the semidefinite program may be reduced. For example, such auxiliary vectors may effectively play a role akin to a register memory, e.g., in clauses defining a MAXSAT problem, thereby allowing better inferences.

Optionally, the output vectors may be computed by minimizing a linear combination ($\langle M, V^T V \rangle$) of inner products ($V^T V$) of the input vectors, the output vectors, and optionally the auxiliary vectors. For example, matrix V may comprise each input vector, output vector, and, if used, each auxiliary vector. Matrix V may additionally comprise a "truth direction", e.g., a randomly initialized fixed vector, e.g., as further elaborated elsewhere. Typically, the vectors are constrained, e.g., each of them may be constrained to have unit norm. This way, an effectively solvable semidefinite program may be obtained.

Optionally, a coefficient of the linear combination for an inner product of two vectors is given by an inner product ($s_i^T s_j$) of two weight vectors associated to the respective vectors, the two weight vectors being comprised in the parameters of the joint optimization. For example, the weight vectors may define a matrix S wherein each row represents a clause and each column represents coefficient of the clause for the respective inputs, outputs, and auxiliary variables. The optimization problem may be formulated as minimizing $\langle S^T S, V^T V \rangle$ over the output and auxiliary vectors of matrix V, e.g., constrained to the vectors of V having unit norm. The values of the weight vectors may be regarded as weights of the optimization layer. For instance, a MAXSAT relaxation may be obtained in this way.

Optionally, the two weight vectors ($s_i$) have fewer elements than the total number of input vectors, output vectors, and optionally auxiliary vectors, e.g., at most half. This way, the knowledge, e.g., in the form of clauses, that the neural network learns may be effectively compressed. In fact, having fewer elements may help to avoid overfitting, and hence allow the network to capture capture/focus on the most important logical relations of the data.

Optionally, the output vectors are computed by repeatedly updating an output vector or auxiliary vector based on the input vectors and current values of the output vectors and auxiliary vectors. In other words, the output vectors are computed by so-called coordinate descent. Coordinate descent not only has favourable convergence properties, it is also by its sequential nature particularly amenable to learning by backpropagation and can hence be integrated particularly well in neural network learning frameworks. Coordinate descent also has the advantage that it can be parallelized and/or implemented efficiently on GPUs.

Optionally, the parameters of the joint optimization comprise weight vectors $s_i$ associated to respective input vectors, output vectors, and optionally auxiliary vectors $v_i$, respective entries $(s_1)_j, \ldots, (s_n)_j$ of the weight vectors defining a linear combination $\Sigma(s_i)_j v_j$ of said vectors representing a clause to be jointly optimized. The output vectors may be computed by:

initializing a state matrix, e.g., $\Omega = VS^T$ where $V = [v_1 \ldots v_n]$ and $S = [s_1 \ldots s_n]$, a column of the state matrix indicating a value of a clause with respect to the input vectors, output vectors, and optionally the auxiliary vectors; and repeatedly updating the output vector or auxiliary vector based on the input vectors and the current values of the output vectors and auxiliary vectors, comprising updating the state matrix based on the updated output vector or auxiliary vector.

By keeping track of a state matrix, e.g., $\Omega = VS^T$, and using it in the coordinate descent, relatively efficient updates may be obtained, e.g., an $O(nmk)$ update may be provided where n is the number of variables, k is the size of the vectors, and m is the number of clauses as discussed above, e.g., of the MAXSAT problem.

Optionally, multiple updates to output vectors and/or auxiliary vectors of the coordinate descent may be performed in parallel. For example, by using coordinate descent, the training and/or application of the neural network may be particularly amenable to GPU implementations. During the inner loop of coordinate descent when applying the neural network, the computation of all $g_\omega$ gradient terms may be parallelized by parallelizing the computation of the state matrix and/or the rank-one updates to the state matrix, and similarly for training. Thus, the use of a low-rank semidefinite program, e.g., defined by the matrix-product $S^TS$ as described above, may be particularly beneficial, e.g., traditional full-rank coordinate gradient descent may not generally allow such parallelization. This may result in significant performance improvements.

Training the neural network may be performed effectively by backpropagating through the computation of determining the output values from the input values. Interestingly, with the measures discussed herein, such an update can be performed efficiently, e.g., the forward pass may be continuous and/or differentiable so that the backward pass can be analytically derived and/or efficiently computed. Especially when the joint optimization comprises repeatedly updating an output vector or auxiliary vector based on input vectors and current values of the output vectors and auxiliary vectors, during training the gradient of the loss with respect to the input vectors and/or the one or more weights may be determined by backpropagating through said repeated updates, thus allowing to obtain the parameters of the optimization in a way that integrates well with neural network training techniques used to train the other layers, e.g., the whole neural network may be trained in an end-to-end fashion.

It will be appreciated by those skilled in the art that two or more of the above-mentioned embodiments, implementations, and/or optional aspects of the present invention may be combined in any way deemed useful.

Modifications and variations of any computer-implemented method and/or any computer readable medium, which correspond to the described modifications and variations of a corresponding system, can be carried out by a person skilled in the art on the basis of the present description.

BRIEF DESCRIPTION OF THE DRAWINGS

These and other aspects of the present invention further explained with reference to the embodiments described by way of example in the following description and with reference to the figures.

FIG. 6 shows a method of applying a neural network.
FIG. 7 shows a method of training a neural network.
FIG. 8 shows a computer-readable medium comprising data.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
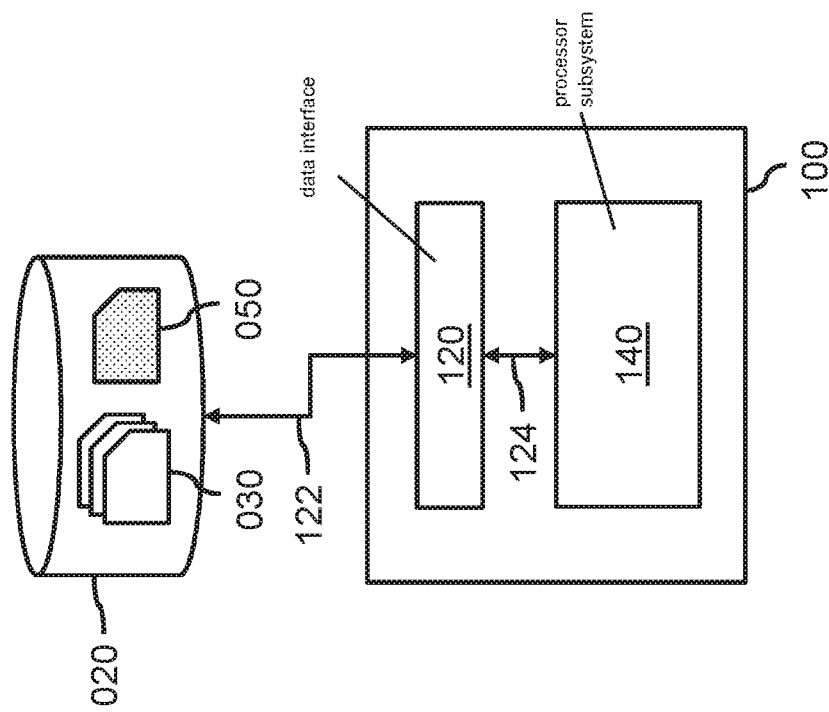
FIG. 1 shows a system for training a neural network.

FIG. 1 shows a system 100 for training a neural network. The system 100 may comprise a data interface 120 and a processor subsystem 140 which may internally communicate via data communication 124. Data interface 120 may be for accessing data 050 representing parameters of a neural network. The neural network may comprise at least one optimization layer. The optimization layer may be for determining values of one or more output neurons from values of one or more input neurons by a joint optimization. Data 050 may comprise one or more parameters of the joint optimization. Data interface 120 may also be for accessing a training dataset 030 comprising one or more training instances.

The processor subsystem 140 may be configured to, during operation of the system 100 and using the data interface 120, access data 030, 050. For example, as shown in FIG. 1, the data interface 120 may provide access 122 to an external data storage 020 which may comprise said data 030, 050. Alternatively, the data 030, 050 may be accessed from an internal data storage which is part of the system 100. Alternatively, the data 030, 050 may be received via a network from another entity. In general, the data interface 120 may take various forms, such as a network interface to a local or wide area network, e.g., the Internet, a storage interface to an internal or external data storage, etc. Data storage 020 may take any conventional and suitable form.

Processor subsystem 140 may be configured to, during operation of the system, train the neural network. Training the neural network may comprise determining a gradient of a loss of the neural network with respect to the one or more input neurons and/or the one or more parameters of the joint optimization from a gradient of the loss with respect to the one or more output neurons of the optimization layer. This gradient may be determined by:

determining a gradient of the loss with respect to output vectors of the one or more output neurons from the gradient with respect to the output neurons; and determining a gradient of the loss with respect to input vectors of the one or more input neurons from the gradient with respect to the output vectors and determining the gradient of the loss of the neural network with respect to the input neurons therefrom, and/or determining the gradient of the loss with respect to the one or more parameters from the gradient with respect to the output vectors.

The loss may be a loss of applying the neural network to one or more training instances of the training dataset. When applying the neural network to the training instances, the output vectors for the one or more output neurons may be computed from the input vectors by jointly optimizing at least the output vectors with respect to the input vectors to solve a semidefinite program defined by the one or more parameters. The backward pass may be performed accordingly.

As an optional component, the system 100 may comprise an image input interface (not shown) or any other type of input interface for obtaining sensor data from a sensor, such as a camera (not shown). Processor subsystem 140 may be configured obtain one or more training instances of the training dataset 030 as sensor data obtained from the sensor.

Figure 4:
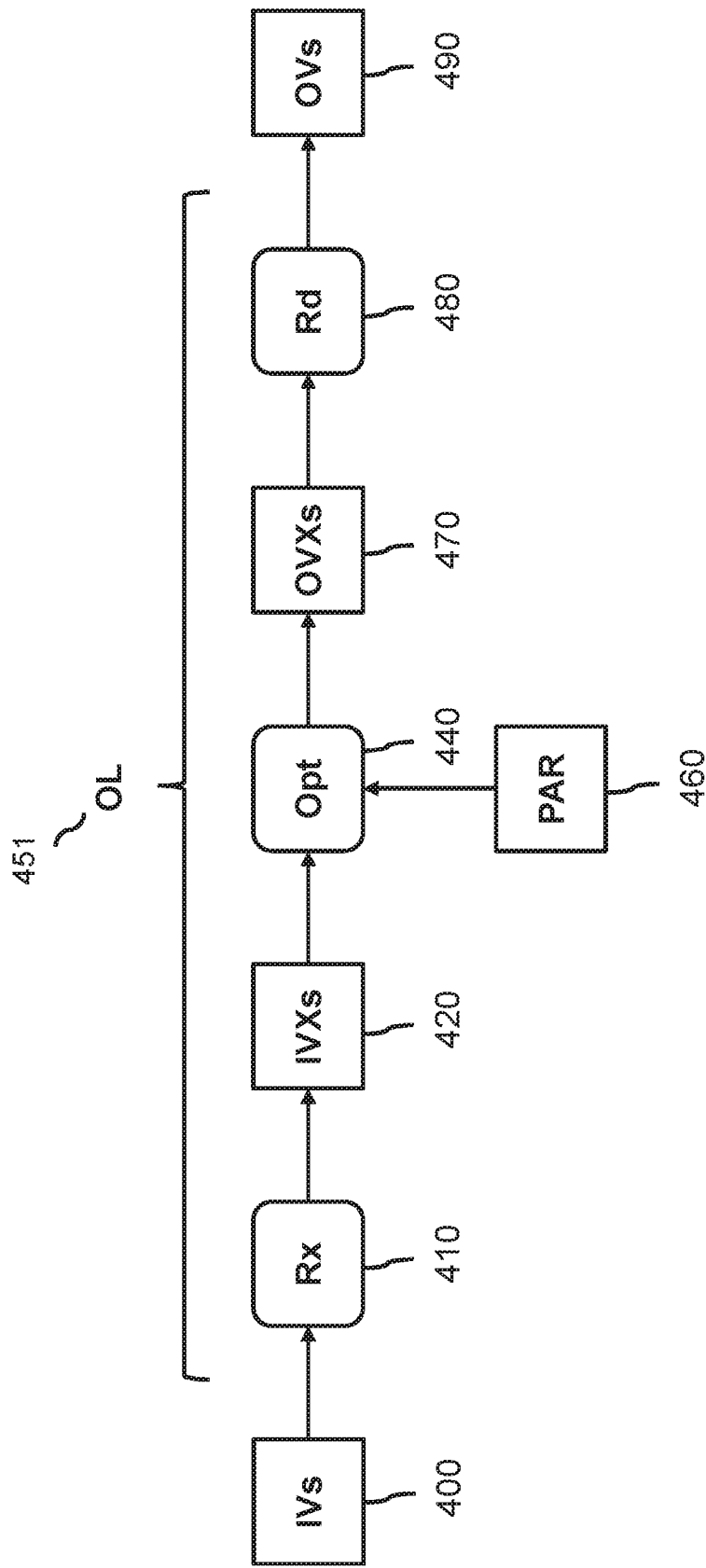
FIG. 4 shows an optimization layer.
Figure 5:
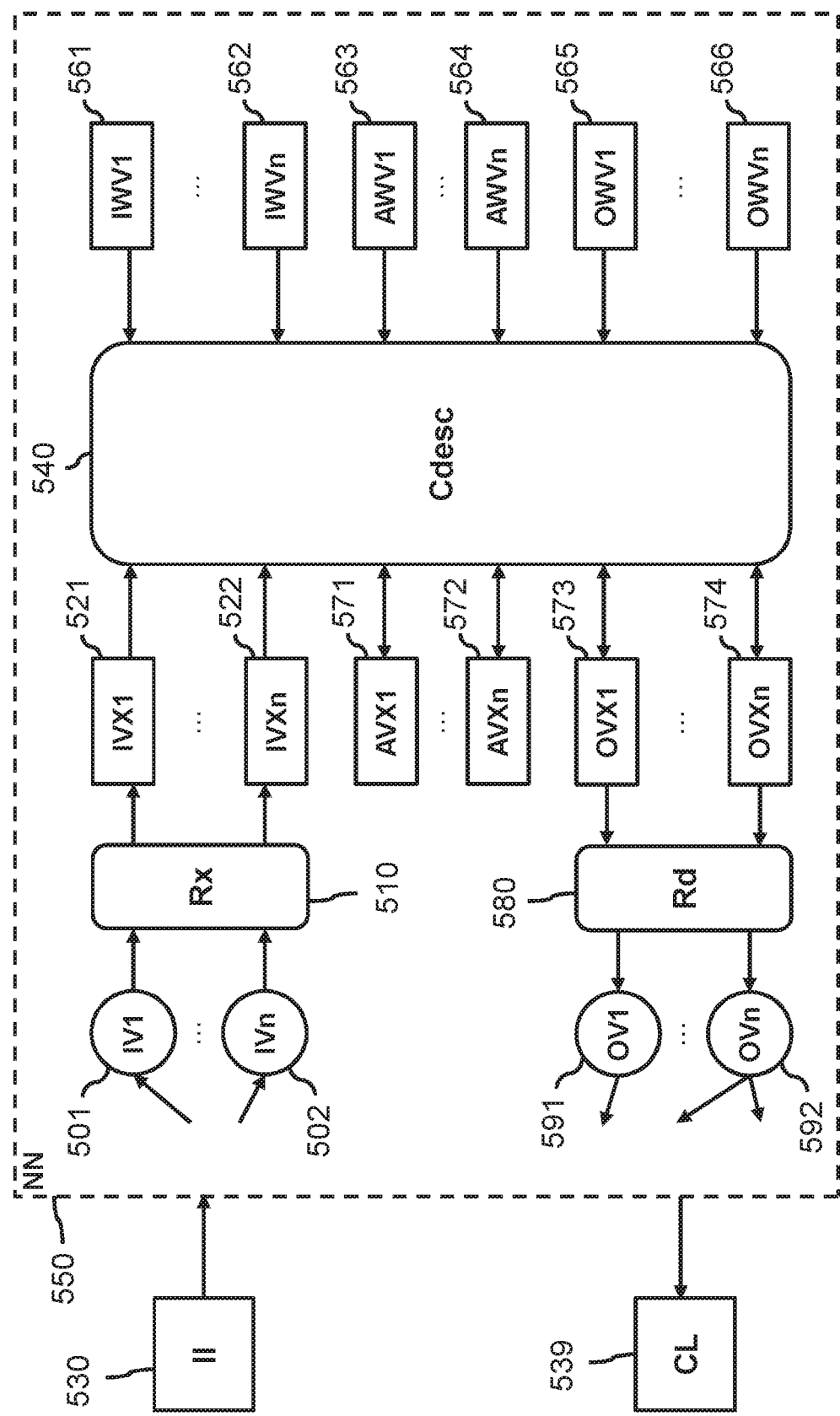
FIG. 5 shows a detailed example of how to train/use an optimization layer.

Various details and aspects of the operation of the system 100 will be further elucidated with reference to FIGS. 4 and 5, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 100 may also be implemented in a distributed manner, e.g., involving different devices or apparatuses, such as distributed servers, e.g., in the form of cloud computing.

Figure 2:
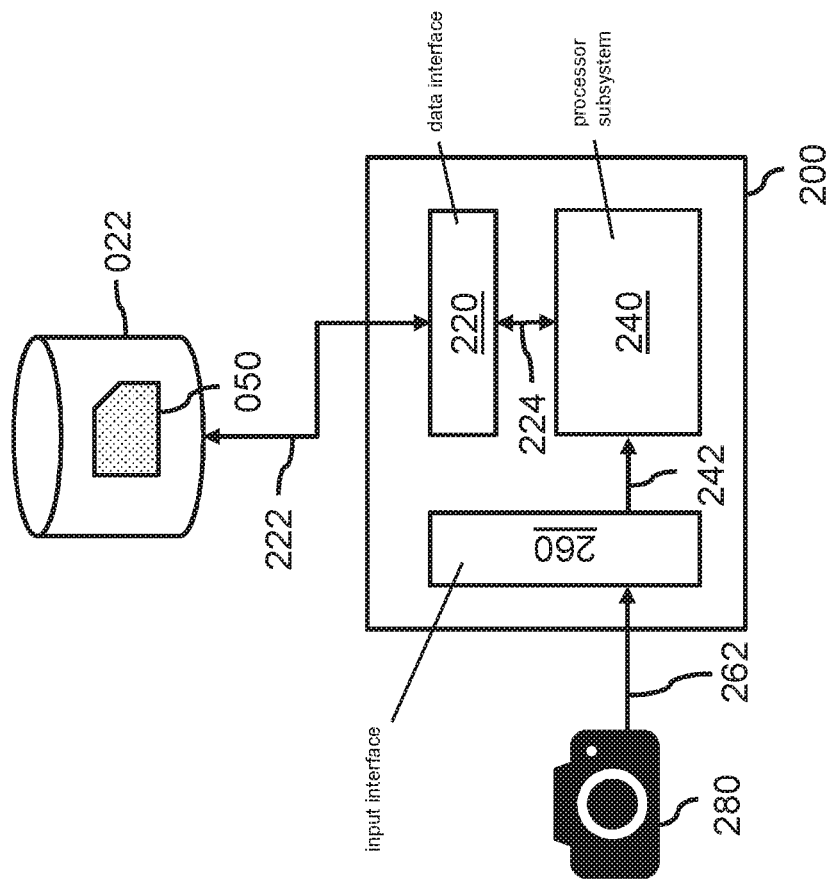
FIG. 2 shows a system for applying a neural network.

FIG. 2 shows a system 200 for applying a neural network to an input instance. The system 200 may comprise a data interface 220 and a processor subsystem 240 which may internally communicate via data communication 224. Data interface 220 may be for accessing data 050 representing a neural network. The neural network may comprise at least one optimization layer. The optimization layer may be for determining values of one or more output neurons from values of one or more input neurons by a joint optimization. Data 050 may comprise one or more parameters of the joint optimization.

The processor subsystem 240 may be configured to, during operation of the system 200 and using the data interface 220, access data 050. The data 050 may be obtained by training the neural network according to a method described herein, e.g., by system 100. For example, as shown in FIG. 2, the data interface 220 may provide access 222 to an external data storage 022 which may comprise said data 050. Alternatively, the data 050 may be accessed from an internal data storage which is part of the system 200. Alternatively, the data 050 may be received via a network from another entity. In general, the data interface 220 may take various forms, such as a network interface to a local or wide area network, e.g., the Internet, a storage interface to an internal or external data storage, etc. The data storage 022 may take any known and suitable form.

Processor subsystem 240 may be configured to, during operation of the system, obtain an input instance. Processor subsystem 240 may be further configured to, during operation of the system apply the neural network 050 to the input instance. Applying the neural network may comprise obtaining the values of the one or more input neurons to the optimization layer and determining input vectors for the one or more input neurons therefrom. Applying the neural network may further comprise computing output vectors for the one or more output neurons from the determined input vectors by jointly optimizing at least the output vectors with respect to the input vectors to solve a semidefinite program defined by the one or more parameters. Applying the neural network may also comprise determining the values of the one or more output neurons from the respective computed output vectors.

As an optional component, the system 200 may comprise an image input interface 260 or any other type of input interface for obtaining sensor data from a sensor, such as a camera 280. The sensor data may be comprised in the instance to be processed by the neural network. For example, the camera may be configured to capture image data 262, processor subsystem 240 being configured to obtain the instance from image data 262 obtained via input interface 260.

As an optional component, the system 200 may comprise an actuator interface (not shown) for providing, to an actuator, actuator data causing the actuator to effect an action in an environment of system 200. For example, processor subsystem 240 may be configured to determine the actuator data based at least in part on the output of the neural network for the input instance, and to provide the actuator data to the actuator via the actuator interface.

Various details and aspects of the operation of the system 200 are further explained with reference to FIGS. 4 and 5, including optional aspects thereof.

In general, the system 200 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 200 may also be implemented in a distributed manner, e.g., involving different devices or apparatuses, such as distributed servers, e.g., in the form of cloud computing.

Figure 3:
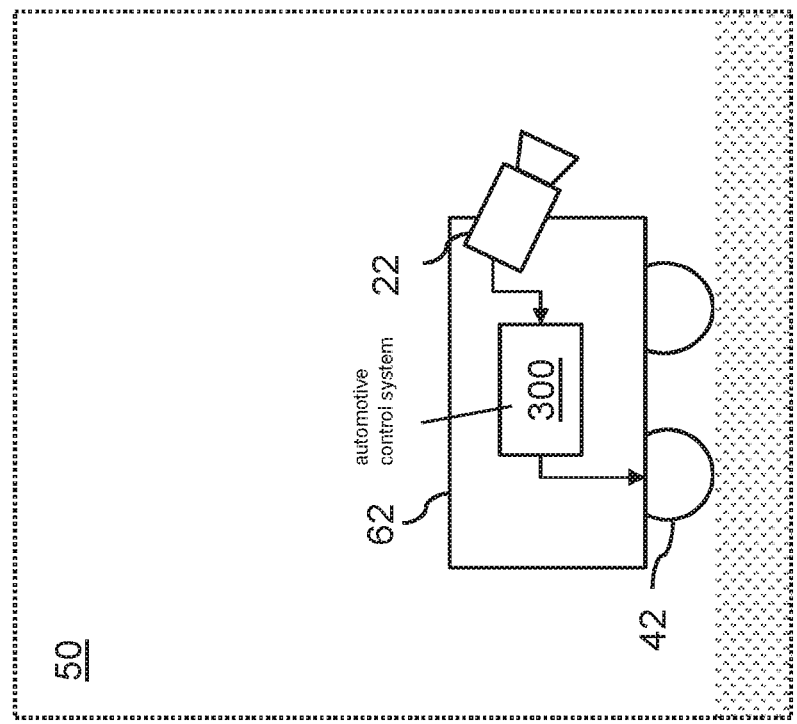
FIG. 3 shows a system for applying a neural network.

FIG. 3 shows an example of the above, in that an automotive control system 300 for controlling a vehicle 62 is shown that comprises a system for applying a neural network to an input instance according to an embodiment, e.g., system 200 of FIG. 2 (not shown separately). The neural network may be an image classifier in this example. Vehicle 62 may be an autonomous or semi-autonomous vehicle, but this is not necessary, e.g., system 300 can also be a driver-assistance system of a non-autonomous vehicle 62.

For example, vehicle 62 may incorporate the neural network application system to control the vehicle based on images obtained from a camera 22. For example, automotive control system 300 may comprise a camera interface (not shown separately) for obtaining an image of an environment 50 of the vehicle from camera 22.

The system may be configured to classify the image obtained from camera 22 using the neural network to detect a situation of interest in the environment 50 of the vehicle, for example, an obstacle with which the vehicle is at risk of colliding. Control system 300 may further comprise an actuator interface (not shown separately) for providing, to an actuator, actuator data causing the actuator to effect an action to control vehicle 62. Automotive control system 300 may be configured to determine actuator data to control vehicle 62 based at least on part on this detection; and to provide the actuator data to the actuator via the actuator interface. For example, the actuator may be caused to control steering and/or braking of the vehicle. For example, the control system may control an electric motor 42 to perform (regenerative) braking in case a situation of interest is detected.

FIG. 4 shows a detailed yet non-limiting example of an optimization layer for use, for instance, by system 100 or 200. The optimization layer OL, 451 shown here is a MAXSAT layer in which, in a joint optimization Opt, 440, a semidefinite program is solved that is a relaxation of the MAXSAT problem. This figure shows the forward pass of the MAXSAT layer, e.g., going from inputs to outputs. The layer may takes as input discrete or probabilistic assignments of known MAXSAT variables. The layer may output guesses for the assignments of unknown variables via an SDP relaxation of the MAXSAT problem with certain weights S. Such a layer may be referred to as a "SATNet layer".

Shown are input values IVs, 400, of the optimization layer OL. The input values may be denoted $z_\alpha$ for $\alpha \in \mathcal{I}$, with $\mathcal{I}$ denoting the set of inputs to the optimization layer. The input values may be discrete, e.g., $z_\alpha \in \{0,1\}$, or probabilistic, e.g., $z_\alpha \in [0,1]$.

As part of the optimization layer OL, in an operation Rx, 410, the input values IVs are relaxed to obtain input vectors IVXs, 420, e.g., an input vector $v_\alpha \in \mathbb{R}^k$ for each input value $\alpha \in \mathcal{I}$. Suitable relaxations are discussed below. Preferably, the relaxation is performed by continuous and/or differentiable function.

Based on the input vectors IVXs, output vectors OVXs, 470, are computed by jointly optimizing Opt, 440, at least the output vectors OVXs with respect to the input vectors IVXs, e.g., by optimizing a loss function with respect to at least the output vectors OVXs while keeping the input vectors IVXs fixed. The output vectors OVXs may be denoted $v_\omega \in \mathbb{R}^k$ for $\omega \in \bar{\mathcal{I}}$, with $\bar{\mathcal{I}}$ denoting the set of outputs of the optimization layer. In this case, optimization Opt is an SDP relaxation of MAXSAT; the parameters PAR, 460, of the SDP relaxation, may comprise weights S defining the SDP relaxation. Detailed examples of such relaxations are discussed elsewhere.

From output vectors OVXs of the optimization, output values OVs, 490, of the optimization layer OL may be determined, in this case by performing rounding Rd, 480. Output values $z_\omega$, $\omega \in \bar{\mathcal{I}}$, in this example may be discrete, e.g., $z_\omega \in \{0,1\}$ or probabilistic, e.g., $z_\omega \in [0,1]$. Rounding Rd may be performed by randomized rounding or other types of rounding explained elsewhere.

As a detailed example of an optimization layer OL, the following description of a SATNet layer is given with reference to formulas and algorithms discussed in more detail with reference to FIG. 5:

---

Algorithm 1: SATNet layer
Procedure init( )
    Initialize m,$n_{aux}$,S // rank, num auxiliary variables, and initial weights
    k ← $\sqrt{2n}$ + 1 // smallest k for which (2) recovers SDP solution
Procedure forward($Z_\mathcal{I}$) // forward pass
    Compute $V_\mathcal{I}$ from $Z_\mathcal{I}$ via (4)
    Compute $V_{\bar{\mathcal{I}}}$ from $V_\mathcal{I}$ via coordinate descent (Alg. 2)
    Compute $Z_{\bar{\mathcal{I}}}$ from $V_{\bar{\mathcal{I}}}$ via (6) $Z_{\bar{\mathcal{I}}}$ -continued Procedure backward($\partial \ell / \partial Z_{\bar{\mathcal{I}}}$) // backward pass
    Compute $\partial \ell / \partial V_{\bar{\mathcal{I}}}$ via (7)
    Compute U from $\partial \ell / \partial V_{\bar{\mathcal{I}}}$ via coordinate descent (Alg. 3)
    Compute $\partial \ell / \partial Z_\mathcal{I}$, $\partial \ell / \partial S$ from U via (13), (12)
    return $\partial \ell / \partial Z_\mathcal{I}$

---

FIG. 5 shows a detailed yet non-limiting example of how to apply and/or train a neural network according to an embodiment. In this example, a neural network NN, 550, is shown.

For example, when applying neural network NN, an input instance II, 530, may be obtained. For example, input instance II may be an image or other type of sensor data. Input instance II may be input by a user, from a sensor, etc. In various embodiments, neural network NN may be configured to determine a classification CL, 539, of the input instance, although this is not necessary. Classification CL may for example be used to determine a control signal for an actuator to effect an action in the environment from which input instance II is sensed. The arrows shown in the figure may indicate various data dependencies in the forward pass of applying the neural network.

For example, when training neural network NN, a back-propagation through the neural network may be performed, e.g., by iteratively determining a gradient of a loss of neural network and adapting the parameters of the neural network to decrease the loss. For example, based on one or more input instances II with corresponding labels, e.g., in a minibatch, a loss may be determined indicating a difference between classifications of neural network NN for respective input instances II and the provided labels of the respective instances. For example, to train neural network NN, optimization frameworks may be used that are conventional such as the Adam optimizer as described in "Adam: A Method for Stochastic Optimization" by Diederik P. Kingma and Jimmy Ba (incorporated herein by reference and available at https://arxiv.org/abs/1412.6980). For example, the loss to be minimized may be a cross-entropy loss, a negative log likelihood, a mean squared error, etc.

As shown in the figure, neural network NN may comprise at least one optimization layer. Neural network NN may also comprise multiple optimization layers, e.g., with one or more outputs of a first optimization layer being input to a second optimization layer, etc.

For example, to learn application of a sequence of operations to an input sequence of length L, neural network NN may comprise a sequence of L−1 optimization layers, e.g., SATNet layers. For example, the sequence of operations may be a sequence of XOR operations successively applied to an input sequence to compute its parity. Some or all of the optimization layers may have tied weights, e.g., in case the same operation is applied multiple times. For example, in case of a binary function such as XOR, the first optimization layer may receive the first two values as input, and layer d may receive receives value d along with the output of layer d−1. If each layer learns to compute the respective operation, the combined system will correctly compute the overall operation. It is noted that using the techniques presented herein, such a neural network with a long series of optimization problems may be trained any intermediate supervision.

As another example of the structure of neural network NN, the neural network may comprise one or more layers of a convolutional neural network followed by one or more optimization layers, e.g., SATNet layers. This way, the neural network may be able to make inferences in terms of low-level sensor input features, e.g., low-level image features. The optimization layers may be followed, e.g., by additional layers to perform classification, regression, encoding into latent features, etc.

As the skilled person understands, the above concrete neural network examples merely serve to illustrate several particular uses of optimization layers as presented herein. Various alternatives or combinations may be envisaged in which optimization layers as presented herein can be beneficially combined with other types of neural network layers, e.g., layers known from LSTM architectures, and/or in various settings, e.g., in a Generative Adversarial Models (GAN), a variational auto-encoders (VAE), etc.

Proceeding now to the optimization layer. The optimization layer may be for determining values OV1, 573, up to OVn, 574 of one or more output neurons. In this example, two output neurons are shown but in general there can be more, e.g., at least 20 or at least 100 output neurons. A single output neuron is also possible however. The values of the output neurons may be determined from values IV1, 501, ..., IVn, 502, of one or more input neurons. Again, there can be one or more, e.g., at least 20 or at least 100 input values. The number of input values and the number of output values may be different. The output values OV1, ... OVn may be determined from the input values IV1, ... IVn by jointly optimizing at least output vectors corresponding to the output values with respect to the input vectors corresponding to the input values, e.g., by determining output vectors that that minimize a loss function which depends on the output vectors and input vectors, while keeping the input values constant.

In various example embodiments, the joint optimization may be a relaxation of an optimization problem on the input values and output values. Specifically, in some embodiments, the joint optimization is a MAXSAT relaxation. Other optimization problems such as MAX2SAT or MAX-CUT may be relaxed similarly.

The MAXSAT problem is the optimization analogue of the well-known satisfiability (SAT) problem, in which the goal is to maximize the number of clauses satisfied. Consider a MAXSAT instance with n variables and m clauses. Let $\tilde{v} \in \{-1,1\}^n$ denote binary assignments of the problem variables, where $\tilde{v}_i$ is the truth value of variable $i \in \{1, \ldots, n\}$, and define $\tilde{s}_i \in \{-1,0,1\}^m$ for $i \in \{1, \ldots, n\}$, where $\tilde{s}_{ij}$ denotes the sign of $\tilde{v}_i$ in clause $j \in \{1, \ldots, m\}$. The MAXSAT problem may be formulated as:

$$\text{maximize}_{\tilde{v} \in \{-1,1\}^n} \sum_{j=1}^{m} \bigvee_{i=1}^{n} 1\{\tilde{s}_{ij}\tilde{v}_i > 0\}. \quad (1)$$

In order to form a semidefinite relaxation of (1), the discrete variables $\tilde{v}_i$ may be relaxed into associated continuous variables $v_i \in \mathbb{R}^k$, $\|v_i\|=1$ w.r.t. some "truth direction" $v_0 \in \mathbb{R}^k$, $\|v_0\|=1$. A coefficient vector may be defined $\tilde{s}_0 = \{-1\}^m$ associated with $v_0$. An SDP relaxation of MAXSAT may be formalized as:

$$\text{minimize}_{V \in \mathbb{R}^{k \times (n+1)}} \quad \langle S^T S, V^T V \rangle, \quad (2)$$
$$\text{subject to} \quad \|v_i\|=1, i=0, \ldots, n,$$
where $V \equiv [v_0 \ v_1 \ \ldots \ v_n] \in \mathbb{R}^{k \times (n+1)}$, and
$$S \equiv [\tilde{s}_0 \ \tilde{s}_1 \ \ldots \ \tilde{s}_n]\text{diag}\left(1\sqrt{4\|\tilde{s}_i\|}\right) \in \mathbb{R}^{m \times (n+1)}.$$

Although generally, various linear combinations $\langle M, V^T V \rangle$ of inner products ($V^T V$) of the vectors in V may be minimized for various choices of matrix M leading to a semidefinite program, choosing $M=S^T S$ is particularly advantageous for its correspondence to the MAXSAT problem. In other words, a coefficient of the linear combination for an inner product of two vectors may be given by an inner product ($s_i^T s_j$) of two weight vectors associated to the respective vectors. The weight vectors may be comprised in the parameters of the joint optimization. The weight vectors may have fewer elements k than the total number n+1 of input vectors, output vectors, and optionally auxiliary vectors, in other words S may be smaller than V and in that sense, S may provide a low-rank parametrization of the optimization layer.

In various embodiments, semidefinite program (2) may be solved by applying coordinate descent. In particular, the objective terms that depend on $v_i$ may be given by $v_i^T \sum_{j=1}^{n} s_i^T s_j v_j$, where $s_i$ is the ith column vector of S. Minimizing this quantity over $v_i$ subject to the constraint that $\|v_i\|=1$ yields the coordinate descent update $$v_i = -g_i/\|g_i\|,$$

where $$g_i = VS^T s_i - \|s_i\|^2 v_i. \quad (3)$$

These updates may converge to the globally optimal fixed point of the SDP.

In various example embodiments, the semidefinite problem is solved using a differentiable, smoothed solver that can be integrated into modern deep network architectures, e.g., neural network NN. Coordinate descent may be used to solve the semidefinite program, e.g., the SDP MAXSAT relation. In particular, using the SDP relaxation of the MAXSAT problem and associated coordinate descent updates, a deep network layer for satisfiability solving may be obtained, e.g., the SATNet layer of FIG. 4.

Proceeding now how neural network NN may be applied to an input instance II in a forward pass. Define $\mathcal{J} \subset \{1, \ldots, n\}$ to be the indices of input variables IV1, ..., IVn, of the optimization layer, e.g., variables with known assignments, and let $\bar{\mathcal{J}} \equiv \{1, \ldots, n\} \setminus \mathcal{J}$ correspond to the indices of output variables OV1, ..., OVn with unknown assignments. The input values may be determined from input instance II, e.g., by evaluating layers of the neural network NN that precede the optimization layer.

The optimization layer may admit as inputs IVi probabilistic or binary inputs $z_\alpha \in \mathcal{A}_{in}$, $\alpha \in \mathcal{J}$ ($\mathcal{A}_{in}=[0,1]$ or $\{0,1\}$), and may output as outputs OVi the assignments of unknown variables $z_\omega \in \mathcal{A}_{out}, \omega \in \bar{\mathcal{J}}$ which are similarly probabilistic or binary ($\mathcal{A}_{out}=[0,1]$ or $\{0,1\}$). We let $Z_\mathcal{J} \in \mathcal{A}_{in}^{|\mathcal{J}|}$ and $Z_{\bar{\mathcal{J}}} \in \mathcal{A}_{out}^{|\bar{\mathcal{J}}|}$ refer to all input and output assignments, respectively. The outputs $Z_{\bar{\mathcal{J}}}$ may be generated via the SDP. The parameters of the joint optimization may comprise the SDP's low-rank coefficient matrix S, for example.

Layer initialization: various aspects of the optimization layer may be configured, e.g., a number of parameters of the joint optimization. In the MAXSAT example, for example, the maximum number of clauses m that this layer can represent may be predefined.

Optionally, the layer's representational ability may be increased by using one or more auxiliary variables that are not connected to the layer's inputs or outputs. The output vectors may be computed by optimizing one or more auxiliary vectors AVX1, 571, . . . , AVXn, 572 jointly with the output vectors. Adding additional variables to the optimization problem may reduce the number of clauses needed to parametrize that problem. Like input variables and output variables, auxiliary variables may be represented as auxiliary vectors, to be jointly optimized with the output vectors. The number of auxiliary variables is generally not the same as the number of input or output vectors. There can be one or multiple auxiliary vectors, e.g., at least 10 or at least 100.

The input vectors, output vectors, and/or auxiliary vectors may have dimension $k=\sqrt{2n}+1$, where n may represent the number of actual problem variables (inputs and/or outputs) in addition to auxiliary variables, e.g., for MAXSAT this may guarantee that the SDP can be solved optimally.

In an operation Rx, 510, layer inputs IV1, . . . , IVn may be relaxed, e.g., input vectors IVX1, 521, . . . , IVXn, 522 may be determined for the respective input value. Preferably, an input vector is determined for each input value in a continuous and/or differential way to facilitate backpropagation. As a concrete example, each layer input $z_\alpha$ for $\alpha \in \mathcal{I}$ may be relaxed to an associated $v_\alpha \in \mathbb{R}^k$ via $$v_\alpha = -\cos(\pi z_\alpha) v_0, \quad (4)$$

where the "truth direction" $v_0 \in \mathbb{R}^k$ may be initialized, e.g., randomly generated, and stored within the layer. Other functions are possible. Effectively, in operation Rx, the optimization layer may relax its inputs into continuous vectors for use in the SDP formulation.

In an operation Cdesc, 540, output vectors OVX1, 573 . . . , OVXn, 574 for the one or more output neurons may be computed from the determined input vectors IVX1, . . . , IVXn by jointly optimizing at least the output vectors with respect to the input vectors to solve a semidefinite program defined by one or more parameters. If there are auxiliary vectors AVX1, . . . , AVXn then these may be optimized as well. The number of output vectors typically corresponds to the number of output values OV1, . . . , OVn.

For example, the one or more parameters may comprise weight vectors S of a MAXSAT relaxation. In this case, there may be one weight vector IWV1, 561, . . . , IWVn, 562 for each input vector; one weight vector AWV1, 563, . . . , AWVn, 564, for each auxiliary vector, and/or one weight vector OWV1, 565, . . . , OWVn, 566 for each output vector. Typically, the weight vectors each have the same length, together forming a matrix S as discussed above. More generally, the parameters may comprise or define coefficients M of a linear combination of inner products of vectors IVX1, . . . , IVXn, AVX1, . . . , AVXn, OVX1, . . . , OVXn.

Interestingly, the output and/or auxiliary vectors are typically determined by the optimization whereas the input vectors remain fixed, as shown by the arrows in the figure.

Given relaxations IVX1, . . . , IVXn, of the inputs IV1, . . . , IVn, $v_\alpha, \alpha \in \mathcal{I}$ (which we collectively refer to as $V_{\mathcal{I}} \in \mathbb{R}^{k \times |\mathcal{I}|}$, e.g., a $\mathcal{I}$-indexed column subset of V) the optimization layer may employ coordinate descent, e.g., by means of updates (3), to compute values for continuous outputs $v_\omega, \omega \in \bar{\mathcal{I}}$ (which we collectively refer to as $V_{\bar{\mathcal{I}}} \in \mathbb{R}^{k \times |\bar{\mathcal{I}}|}$). In other words, the output vectors OVX1, . . . , OVXn may be computed by repeatedly updating an output vector OVXi or auxiliary vector AVXi based on the input vectors IVXi and current values of the output vectors OVXi and auxiliary vectors AVXi. Interestingly, these updates can be computed just for output variables and auxiliary variables, e.g., computation can be avoided for variables whose assignments are given as input to the layer.

An example coordinate descent algorithm for the forward pass for the MAXSAT relaxation is given in detail below:

```
Algorithm 2: Forward pass coordinate descent
Data: V_I V_Ī                    // inputs and initial guesses
Ω ← VS^T
while not converged do
    for w ∈ Ī do                 // for all output variables
        g_ω ← Ωs_ω - ||s_ω||² v_ω v_ω ← - g_ω / ||g_ω||

Ω ← Ω + (v_ω - v_ω^prev) s_ω^T
return V_Ī                       // final guess for output columns of V
```

As exemplified in the above algorithm, coordinate descent may be implemented efficiently by maintaining a state matrix, term $\Omega = VS^T$ needed to compute $g_\omega$. As discussed, respective entries of the weight vectors IWV1, . . . , OWVn, in other words, a row of matrix S, may define a linear combination of vectors IVX1, . . . , OVXn representing a clause to be jointly optimized. As such, a column of the state matrix ω may indicating a value of such a clause with respect to the input vectors, output vectors, and optionally the auxiliary vectors. As exemplified, the state matrix may be updated via a rank-one update during each inner iteration. Accordingly, a per-iteration runtime of O(nmk) may be achieved. It has been observed that in practice, often only a small number of iterations is required for convergence.

In operation Rd, 580, discrete or probabilistic values OV1, . . . , OVn, of the one or more output neurons are determined from the respective computed output vectors OVX1, . . . , OVXn. Given the output vectors, e.g., relaxed outputs $v_\omega, \omega \in \bar{\mathcal{I}}$ from coordinate descent, the optimization layer may convert these outputs to discrete or probabilistic variable assignments $z_\omega$, e.g., via thresholding or randomized rounding. Interestingly, operation Rd may be continuous and/or differentiable or at least allow training as a continuous and/or differentiable function.

For example, randomized rounding may be used, wherein a random hyperplane r may be generated, e.g., from the unit sphere, and $$\tilde{v}_\omega = \begin{cases} 1 & \text{if } \operatorname{sign}(v_\omega^T r) = \operatorname{sign}(v_0^T r) \\ -1 & \text{otherwise} \end{cases}, \omega \in \bar{\mathcal{I}}, \quad (5)$$

may be assigned where $\tilde{v}_\omega$ is the boolean output for $v_\omega$. Using this or similar methods, $\tilde{v}_\omega$ may be to "true" only if $v_\omega$ is similar to $v_0$, e.g., if $v_\omega$ is on the same side as the truth vector $v_0$ w.r.t. the random hyperplane r.

During training, instead or performing randomized rounding, it may be noted that the probability that $v_\omega$ and $v_0$ are on the same side of any given r is $$P(\tilde{v}_\omega) = \cos^{-1}(-v_\omega^T v_0)/\pi, \quad (6)$$

accordingly, $z_\omega = P(\tilde{v}_\omega)$ may be set equal this probability.

When applying the neural network NN, e.g., probabilistic outputs may be output in the same fashion, or discrete assignments may be output via thresholding or by explicitly applying randomized rounding. In the randomized rounding case, rounding may be performed multiple times, and a boolean solution may be picked maximizing the optimization problem at hand, e.g., MAXSAT objective (1). E.g., $z_\omega = \hat{v}_\omega$ may be set.

Proceeding now to training neural network NN in a backward pass. When training the neural network NN, a backward pass may be performed to determine a gradient of a loss of the neural network with respect to the one or more input neurons and/or the one or more parameters of the joint optimization from a gradient of the loss with respect to the one or more output neurons of the optimization layer. Given the gradients $\partial \ell / \partial Z_{\bar{J}}$ of the network loss $\ell$ w.r.t. the layer outputs, the gradients $\partial \ell / \partial Z_J$ and $\partial \ell / \partial S$ of the loss w.r.t. the respective layer inputs and weights may be computed. The loss may be a cross-entropy loss, a negative log likelihood, a mean squared error, etc.

Interestingly, in some cases, the computation may be based on analytical expressions to compute the desired gradients directly, enabling an efficient coordinate descent algorithm. This is exemplified for the SDP relaxation of the MAXSAT problem below. However, explicit analytical expressions are not needed, e.g., numerical approximations can be used.

From probabilistic outputs to their continuous relaxations. Given $\partial \ell / \partial Z_{\bar{J}}$, an expression for $\partial \ell / \partial V_{\bar{J}}$ may be used as obtained by pushing gradients through the probability assignment mechanism, that is, for each $\omega \in \bar{J}$, $$\frac{\partial \ell}{\partial v_\omega} = \left(\frac{\partial \ell}{\partial z_\omega}\right)^T \frac{\partial z_\omega}{\partial v_\omega} = \left(\frac{\partial \ell}{\partial z_\omega}\right)^T \frac{1}{\pi \sin(\pi z_\omega)} v_0, \quad (7)$$

where we obtain $\partial z_\omega / \partial v_\omega$ by differentiating through Equation (6).

Backpropagation through the SDP. Given the result $\partial \ell / \partial V_{\bar{J}}$, we next seek to compute $\partial \ell / \partial V_J$ and $\partial \ell / \partial S$ by pushing gradients through the SDP solution procedure. The solution of the SDP problem may be differentiated with respect to the problem's parameters and input by means of a matrix-vector solve. To compute the solution for this linear system, a coordinate descent approach may be used that closely mirrors the computation in the forward pass, and which has similar fast convergence properties. As an example, suppose we are given the gradients $\partial \ell / \partial v_\omega$ of the loss with respect all continuous SDP output vectors $v_\omega, \omega \in \bar{J}$. it is possible to apply an analytical expression for the gradient of the loss w.r.t. some weight matrix parameter $s_{\alpha j}, \alpha \in J, j \in \{0, \ldots, m\}$, e.g., to compute an explicit form for $$(\partial \ell / \partial s_{\alpha j}) = \sum_{\omega \in \bar{J}} (\partial \ell / \partial v_\omega)^T (\partial v_\omega / \partial s_{\alpha j})$$

as follows.

We start by deriving the intermediate term $(\partial v_\omega / \partial s_{\alpha j})$; since our coordinate descent updates (3) may converge to a fixed point, we can find this gradient by rearranging the final update as $$-\|g_\omega\| v_\omega = \sum_{i \neq \alpha} s_i^T s_\omega v_i + s_\alpha^T s_\omega v_\alpha - \|s_\omega\|^2 v_\omega \quad (8)$$

and differentiating through this equation via the implicit function theorem as $$\|g_\omega\| \frac{\partial v_\omega}{\partial s_{\alpha j}} + P_\omega \sum_{i \in \bar{J}} c_{i\omega} v_i = -P_\omega v_\alpha s_{\omega j}, \quad (9)$$

for all $\omega \in \bar{J}$, where $C = S_{\bar{J}}^T S_{\bar{J}} - \text{diag}(\|s_\omega\|^2)$ and $P_\omega = I_k - v_\omega v_\omega^T$. (Here, $S_{\bar{J}}$ refers to the $\bar{J}$-indexed column subset of S.) It is noted that (9) may be a linear system in $\partial v_\omega / \partial s_{\alpha j}$ for all $\omega \in \bar{J}$.

Define $\eta_\omega$ to capture the right side of Equation (9). Solving this linear system and applying the chain rule, we see that $$\frac{\partial \ell}{\partial s_{\alpha j}} = \sum_{\omega \in \bar{J}} \left(\frac{\partial \ell}{\partial v_\omega}\right)^T \left(\frac{\partial v_\omega}{\partial s_{\alpha j}}\right) = tr(\hat{\eta}^T (C+D)^\dagger \hat{\xi}), \quad (10)$$

where $\hat{\eta}$ and $\hat{\xi}$ are indexed by $$\hat{\eta}_\omega = P_\omega \frac{\partial \ell}{\partial v_\omega}$$

and $\hat{\xi}_\omega = P_\omega \eta_\omega$, and where $D = \text{diag}(\|g_\omega\|)$. For a fixed $\alpha \in J$, this derivation may be similar for all $s_{\alpha j}$; in fact, typically only the term $\hat{\xi}$ has an explicit dependence on j. Therefore, for a fixed $\alpha$, we can inexpensively compute the gradients of the loss w.r.t. all $s_{\alpha j}$ by precomputing the matrix-vector product $U = (C+D)^\dagger \eta$ and $\hat{u}_i = P_i u_i$. This matrix-vector solve may be solved via block coordinate descent, e.g., as in Alg. 3 shown below.

An analytical form for the gradients may be given by $$\frac{\partial \ell}{\partial V_J} = -(\sum_{\omega \in \bar{J}} \hat{u}_\omega s_\omega^T) S_{\bar{J}}, \quad (11)$$

$$\frac{\partial \ell}{\partial S} = -V(\sum_{\omega \in \bar{J}} \hat{u}_\omega s_\omega^T) - \hat{U}(VS^T), \quad (12)$$

where $\hat{u}_i$ is the ith column of $\hat{U}$, and $S_{\bar{J}}$ denotes the $\bar{J}$-indexed column subset of S. Equation (12) may be the analytical form of the weight gradient $\partial \ell \partial S$ used by our layer.

From relaxed to original inputs. The gradient $\partial \ell / \partial V_J$ (w.r.t. the input relaxations) may be used to derive the gradient $\partial \ell / \partial Z_J$ (w.r.t. the actual inputs) by pushing gradients through the input relaxation procedure. For each $\alpha \in J$, it may be the case that $$\frac{\partial \ell}{\partial z_\alpha} = \frac{\partial \ell}{\partial z_\alpha^*} + \left(\frac{\partial \ell}{\partial v_\alpha}\right)^T \frac{\partial v_\alpha}{\partial z_\alpha} \quad (13)$$

$$= \frac{\partial \ell}{\partial z_\alpha^*} - (\pi \sin(\pi z_\alpha)) v_0^T (\sum_{\omega \in \bar{J}} \hat{u}_\omega s_\omega^T) s_\alpha,$$

where $\partial \ell /\partial z^*_\alpha$ captures any direct dependence of $\ell$ on $z^*_\alpha$ (as opposed to dependence through $v_\alpha$). Equation (13) may represent the analytical form of the input gradient $\partial \ell /\partial Z_j$ used by our layer.

Computing Back-Propagation Terms Via Coordinate Descent

The linear system $U = +(C+D)^\dagger \hat{\eta}$ may be solved via coordinate descent. Interestingly, the techniques exemplified in Algorithm 3 below may enable to compute the desired gradients without needing to maintain intermediate Jacobians explicitly. Mirroring the forward pass, rank-one updates may be used to maintain and modify the term $\Psi = US^T$ needed to compute $dg_\omega$. Indeed, by computing the Jacobian-vector product needed for backpropagation, e.g., using the coordinate descent approach, it may be avoided to compute the Jacobian itself. The Jacobian can be large, e.g., the V matrix used within the SDP relaxation of the MAXSAT problem solution may be kn, so the full Jacobian of this term may be a kn×kn matrix. Thus, storage and/or computation may be significantly reduced.

An example procedure for computing gradients for the SDP relaxation of the MAXSAT problem is detailed below:

---

Algorithm 3: Backward pass coordinate descent
Data: $\{\partial \ell /\partial v_\omega\}$ // gradients of loss $\hat{\eta}_\omega \leftarrow P_i \dfrac{\partial \ell}{\partial v_\omega}$ // projected backprop grads Compute $(D + C)^\dagger \hat{\eta}$ and store in the variable U
$U \leftarrow 0$ and $\Psi \leftarrow (U_j) S_j^T = 0$
while not converged do
  for $w \in \bar{j}$ do  // for all output variables
    $dg_\omega \leftarrow (\Psi)s_\omega - \|s_\omega\|^2 u_\omega - \hat{\eta}_\omega$
    $u_\omega \leftarrow = -dg_\omega/\|g_\omega\|$
    $\Psi \leftarrow \Psi + (u_\omega - u_\omega^{prev})s_\omega^T$
return $\hat{u} = P_\omega u_\omega, \forall \omega$

---

FIG. 6 shows a block-diagram of computer-implemented method 600 of applying a neural network to an input instance.

Method 600 may comprise, in an operation titled "ACCESSING NEURAL NETWORK DATA", accessing 610 data representing a neural network. The neural network may comprise at least one optimization layer. The optimization layer may be for determining values of one or more output neurons from values of one or more input neurons by a joint optimization. The data may comprise one or more parameters of the joint optimization. The method may further comprise, in an operation titled "OBTAINING INPUT INSTANCE", obtaining 620 an input instance. The method may further comprise, in an operation titled "APPLYING NEURAL NETWORK", applying 630 the neural network to the input instance. Applying 630 the neural network may comprise, in an operation titled "OBTAINING INPUT VALUES", obtaining 631 the values of the one or more input neurons to the optimization layer. Applying 630 may further comprise, in an operation titled "DETERMINING INPUT VECTORS", determining 632 input vectors for the one or more input neurons from the values of the one or more input neurons. Applying 630 may further comprise, in an operation titled "SOLVING SEMI-DEFINITE PROGRAM", computing 633 output vectors for the one or more output neurons from the determined input vectors by jointly optimizing at least the output vectors with respect to the input vectors to solve a semidefinite program defined by the one or more parameters. Applying 630 may further comprise, in an operation titled "DETERMINING OUTPUT VALUES", determining 634 the values of the one or more output neurons from the respective computed output vectors.

The method 600 may correspond to an operation of the system 200 of FIG. 2. However, this is not a limitation, in that the method 600 may also be performed using another system, apparatus or device.

FIG. 7 shows a block-diagram of computer-implemented method 700 of training a neural network.

Method 700 may comprise, in an operation titled "ACCESSING NEURAL NETWORK, TRAINING DATA", accessing 710 data representing parameters of a neural network and accessing a training dataset comprising one or more input instances. The neural network may comprise at least one optimization layer. The optimization layer may be for determining values of one or more output neurons from values of one or more input neurons by a joint optimization. The data may comprise one or more parameters of the joint optimization.

Method 700 may further comprise, in an operation titled "TRAINING NEURAL NETWORK", training 720 the neural network. Training 720 may comprise, in an operation titled "DETERMINING LOSS GRADIENT", determining 730 a gradient of a loss of the neural network with respect to the one or more input neurons and/or the one or more parameters of the joint optimization from a gradient of the loss with respect to the one or more output neurons of the optimization layer.

Determining 730 the gradient may comprise, in an operation titled "DETERMINING GRADIENT W.R.T. OUTPUT VECTORS", determining 731 a gradient of the loss with respect to output vectors of the one or more output neurons from the gradient with respect to the output neurons.

Determining 730 may further comprise, in an operation titled "DETERMINING GRADIENT W.R.T. INPUT VECTORS", determining 732 a gradient of the loss with respect to input vectors of the one or more input neurons from the gradient with respect to the output vectors. Determining 730 may further comprise, in an operation titled "DETERMINING GRADIENT W.R.T. INPUT NEURONS", determining 733 the gradient of the loss of the neural network with respect to the input neurons from the gradient of the loss with respect to the input vectors.

Instead of or in addition to operations 732 and 733, determining 730 may comprise, in an operation titled "DETERMINING GRADIENT W.R.T. PARAMETERS", determining 734 the gradient of the loss with respect to the one or more parameters from the gradient with respect to the output vectors.

The output vectors for the one or more output neurons may be computed from the determined input vectors by jointly optimizing at least the output vectors with respect to the input vectors to solve a semidefinite program defined by the one or more parameters.

The method 700 may correspond to an operation of the system 100 of FIG. 1. However, this is not a limitation, in that the method 700 may also be performed using another system, apparatus or device.

It will be appreciated that, in general, the operations of methods 600 and 700 may be performed in any suitable order, e.g., consecutively, simultaneously, or a combination thereof, subject to, where applicable, a particular order being necessitated, e.g., by input/output relations.

The method(s) may be implemented on a computer as a computer implemented method, as dedicated hardware, or as a combination of both. As also illustrated in FIG. 8, instructions for the computer, e.g., executable code, may be stored on a computer readable medium 800, e.g., in the form of a series 810 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 8 shows an optical disc 800. Alternatively, the computer readable medium 800 may comprise transitory or non-transitory data 810 representing parameters of the joint optimization as described elsewhere in this specification.

Although neural networks as presented herein are applicable to a wide range of problems, several specific examples are provided below.

Action recognition from videos: Assume that we are given a video sequence as an input and the goal is to recognize some action happening on the scene. For example, in an autonomous driving system, the system makes decisions by making use of visual data. In many of such cases the rules for decision making cannot be explicitly or easily defined. However, by applying the techniques described herein, a neural network may be trained and/or used which can perform learn logical reasoning based on a set of visual information.

Image captioning: We can consider the problem of describing a scene in a digital image by one sentence. By making use of a training set of pairs of images along with their short descriptions, the proposed network can learn the general rules of giving a description and can generalize better for unseen images. For example, the neural network may comprise a LTSM or recurrent neural network following the optimization layer.

Recognition of handwritten text: Assume that we are given a text, contained by a document, that is e.g. scanned or given as a digital image and the goal is to recognize the text. Even for the case when the text has been printed, one should take into consideration some noise or missing data. The problem becomes even more challenging when we consider handwritten text recognition as the variety, and therefore, the complexity of the problem grows drastically. In this task one should consider even more imperfect observations, which is hard to handle without having a large amount of training data. In this setting, our proposed neural network may learn how to recognize usual mistakes made by humans. As a consequence, a smaller number of training examples may be needed to train the network. Moreover, the recognition task may be solved more accurately as the network learns a more general model, that can better discriminate between in some uncertain situations, since it can explore more sophisticated relations within the data.

Natural language recognition: Similar to text recognition, the techniques disclosed herein may also be applied to natural language recognition. As we cannot expect perfect, e.g., noiseless data, the missing information may be modelled. This may be achieved by neural networks as proposed herein, using an optimization layer to learn the more complex relation in the training data.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements.

Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device including enumerating several elements, several of these elements may be embodied by one and the same item of hardware. The mere fact that certain measures are recited in mutually separately does not indicate that a combination of these measures cannot be used to advantage.

What is claimed is:

1. A hardware system for applying a neural network to an input instance, the system comprising:
   a hardware data interface for accessing data representing a neural network, the neural network including at least one optimization layer, wherein the optimization layer is for determining values of one or more output neurons from values of one or more input neurons by a joint optimization, the data including one or more parameters of the joint optimization;
   a hardware processor subsystem configured to:
      obtain an input instance;
      apply the neural network to the input instance, by:
         obtaining the values of the one or more input neurons to the optimization layer and determining input vectors for the one or more input neurons from the obtained values;
         computing output vectors for the one or more output neurons from the determined input vectors by jointly optimizing at least the output vectors with respect to the input vectors to solve a semidefinite program defined by the one or more parameters;
         determining the values of the one or more output neurons from the respective computed output vectors; and
         controlling a vehicle using a control system that applies the neural network to the input instance based on the determining the values.

2. The hardware system according to claim 1, wherein the semidefinite program includes a relaxation of a MAXSAT problem or a MAX2SAT problem or a MAXCUT problem with respect to the values of at least the one or more input neurons and the one or more output neurons.

3. The hardware system according to claim 1, wherein the hardware processor subsystem is configured to compute the output vectors by optimizing one or more auxiliary vectors jointly with the output vectors.

4. The hardware system according to claim 3, wherein the hardware processor subsystem is configured to compute the output vectors by minimizing a linear combination of inner products of the input vectors, the output vectors, and the auxiliary vectors.

5. The hardware system according to claim 3, wherein the hardware processor subsystem is configured to compute the output vectors by repeatedly updating an output vector or auxiliary vector based on the input vectors and current values of the output vectors and auxiliary vectors.

6. The hardware system according to claim 5, wherein the parameters of the joint optimization include weight vectors associated to respective input vectors, output vectors, and auxiliary vectors, respective entries of the weight vectors defining a linear combination of the respective input vectors, output vectors, and auxiliary vectors representing a clause to be jointly optimized, the hardware processor subsystem being configured to compute the output vectors by:
    initializing a state matrix, a column of the state matrix indicating a value of a clause with respect to the input vectors, output vectors, and the auxiliary vectors; and
    repeatedly updating the output vector or auxiliary vector based on the input vectors and the current values of the output vectors and auxiliary vectors, comprising updating the state matrix based on the updated output vector or auxiliary vector.

7. The hardware system according to claim 1, wherein the hardware processor subsystem is configured to compute the output vectors by minimizing a linear combination of inner products of the input vectors and the output vectors.

8. The hardware system according to claim 7, wherein a coefficient of the linear combination for an inner product of two vectors is given by an inner product of two weight vectors associated to the respective vectors, the two weight vectors being comprised in the parameters of the joint optimization.

9. The hardware system according to claim 8, wherein the two weight vectors have fewer elements than total number of input vectors, and output vectors.

10. The hardware system according to claim 1, wherein the input instance includes an image, and wherein the neural network includes at least one convolutional layer, the at least one convolutional layer being followed by the optimization layer.

11. A hardware system for training a neural network, the system comprising:
    a hardware data interface for accessing data representing parameters of a neural network, the neural network including at least one optimization layer, wherein the optimization layer is for determining values of one or more output neurons from values of one or more input neurons by a joint optimization, the data including one or more parameters of the joint optimization, the data interface further for accessing a training dataset including one or more input instances;
    a hardware processor subsystem configured to train the neural network, wherein the training of the neural network includes determining a gradient of a loss of the neural network with respect to the one or more input neurons and/or the one or more parameters of the joint optimization from a gradient of the loss with respect to the one or more output neurons of the optimization layer by:
        determining a gradient of the loss with respect to output vectors of the one or more output neurons from the gradient with respect to the output neurons;
        determining a gradient of the loss with respect to input vectors of the one or more input neurons from the gradient with respect to the output vectors and determining the gradient of the loss of the neural network with respect to the input neurons therefrom, and/or determining the gradient of the loss with respect to the one or more parameters from the gradient with respect to the output vectors;
    wherein the output vectors for the one or more output neurons are computed from the determined input vectors by jointly optimizing at least the output vectors with respect to the input vectors to solve a semidefinite program defined by the one or more parameters; and
    controlling a vehicle using a control system that applies the neural network to the input instance based on the determining the values.

12. The hardware system according to claim 11, wherein the joint optimization includes repeatedly updating an output vector or auxiliary vector based on input vectors and current values of the output vectors and auxiliary vectors, and wherein the processor subsystem is configured to determine the gradient of the loss with respect to the input vectors and/or the one or more weights by backpropagating through the repeated updates.

13. A computer-implemented method of applying a neural network to an input instance, the method comprising the following steps:
    accessing data representing a neural network, the neural network including at least one optimization layer, wherein the optimization layer is for determining values of one or more output neurons from values of one or more input neurons by a joint optimization, the data including one or more parameters of the joint optimization;
    obtaining an input instance;
    applying the neural network to the input instance, including:
        obtaining the values of the one or more input neurons to the optimization layer and determining input vectors for the one or more input neurons from the obtained values;
        computing output vectors for the one or more output neurons from the determined input vectors by jointly optimizing at least the output vectors with respect to the input vectors to solve a semidefinite program defined by the one or more parameters;
        determining the values of the one or more output neurons from the respective computed output vectors; and
    controlling a vehicle using a control system that applies the neural network to the input instance based on the determining the values.

14. The computer-implemented method according to claim 13, wherein the input instance includes an image, and wherein the neural network includes at least one convolutional layer, the at least one convolutional layer being followed by the optimization layer.

15. A computer-implemented method of training a neural network, the method comprising the following steps:
    accessing data representing parameters of a neural network, the neural network including at least one optimization layer, wherein the optimization layer is for determining values of one or more output neurons from values of one or more input neurons by a joint optimization, the data including one or more parameters of the joint optimization, and accessing a training dataset including one or more input instances;
    training the neural network, wherein the training of the neural network includes determining a gradient of a loss of the neural network with respect to the one or more input neurons and/or the one or more parameters of the joint optimization from a gradient of the loss with respect to the one or more output neurons of the optimization layer by:
        determining a gradient of the loss with respect to output vectors of the one or more output neurons from the gradient with respect to the output neurons;
        determining a gradient of the loss with respect to input vectors of the one or more input neurons from the gradient with respect to the output vectors and determining the gradient of the loss of the neural network with respect to the input neurons therefrom, and/or determining the gradient of the loss with respect to the one or more parameters from the gradient with respect to the output vectors, wherein the output vectors for the one or more output neurons are computed from the determined input vectors by jointly optimizing at least the output vectors with respect to the input vectors to solve a semidefinite program defined by the one or more parameters; and controlling a vehicle using a control system that applies the neural network to the input instance based on the determining the values.

16. The computer-implemented method according to claim 15, wherein the one or more input instances include an image, and wherein the neural network includes at least one convolutional layer, the at least one convolutional layer being followed by the optimization layer.

17. A non-transitory computer-readable medium on which is stored data representing instructions for applying a neural network to an input instance, the data, when executed by a processor system, causing the processor system to perform the following steps:

accessing data representing a neural network, the neural network including at least one optimization layer, wherein the optimization layer is for determining values of one or more output neurons from values of one or more input neurons by a joint optimization, the data including one or more parameters of the joint optimization;

obtaining an input instance;

applying the neural network to the input instance, including:

obtaining the values of the one or more input neurons to the optimization layer and determining input vectors for the one or more input neurons from the obtained values;

computing output vectors for the one or more output neurons from the determined input vectors by jointly optimizing at least the output vectors with respect to the input vectors to solve a semidefinite program defined by the one or more parameters;

determining the values of the one or more output neurons from the respective computed output vectors; and controlling a vehicle using a control system that applies the neural network to the input instance based on the determining the values.

18. The non-transitory computer-readable medium according to claim 17, wherein the input instance includes an image, and wherein the neural network includes at least one convolutional layer, the at least one convolutional layer being followed by the optimization layer.

19. A non-transitory computer-readable medium on which is stored data representing instructions for training a neural network, the data, when executed by a processor system, causing the processor system to perform the following steps:

accessing data representing parameters of a neural network, the neural network including at least one optimization layer, wherein the optimization layer is for determining values of one or more output neurons from values of one or more input neurons by a joint optimization, the data including one or more parameters of the joint optimization, and accessing a training dataset including one or more input instances;

training the neural network, wherein the training of the neural network includes determining a gradient of a loss of the neural network with respect to the one or more input neurons and/or the one or more parameters of the joint optimization from a gradient of the loss with respect to the one or more output neurons of the optimization layer by:

determining a gradient of the loss with respect to output vectors of the one or more output neurons from the gradient with respect to the output neurons; and determining a gradient of the loss with respect to input vectors of the one or more input neurons from the gradient with respect to the output vectors and determining the gradient of the loss of the neural network with respect to the input neurons therefrom, and/or determining the gradient of the loss with respect to the one or more parameters from the gradient with respect to the output vectors, wherein the output vectors for the one or more output neurons are computed from the determined input vectors by jointly optimizing at least the output vectors with respect to the input vectors to solve a semidefinite program defined by the one or more parameters; and controlling a vehicle using a control system that applies the neural network to the input instance based on the determining the values.

20. The non-transitory computer-readable medium according to claim 19, wherein the one or more input instances include an image, and wherein the neural network includes at least one convolutional layer, the at least one convolutional layer being followed by the optimization layer.

21. A non-transitory computer-readable medium on which is stored data representing parameters of a neural network, the neural network including at least one optimization layer, wherein the optimization layer is for determining values of one or more output neurons from values of one or more input neurons by a joint optimization, the data including one or more parameters of the joint optimization, and wherein the neural network is configured to be applied to an input instance by:

obtaining the values of the one or more input neurons to the optimization layer and determining input vectors for the one or more input neurons from the obtained values;

computing output vectors for the one or more output neurons from the determined input vectors by jointly optimizing at least the output vectors with respect to the input vectors to solve a semidefinite program defined by the one or more parameters; and determining the values of the one or more output neurons from the respective computed output vectors; and controlling a vehicle using a control system that applies the neural network to the input instance based on the determining the values.

22. The non-transitory computer-readable medium according to claim 21, wherein the input instance includes an image, and wherein the neural network includes at least one convolutional layer, the at least one convolutional layer being followed by the optimization layer.

* * * * *